United States Patent
Qin et al.

(10) Patent No.: US 9,353,205 B2
(45) Date of Patent: May 31, 2016

(54) PROCESSES FOR THE PREPARATION OF HIGH-CIS POLYDIENES

(71) Applicant: Bridgestone Corporation, Tokyo (JP)

(72) Inventors: Zengquan Qin, Copley, OH (US);
Kevin M. McCauley, Akron, OH (US);
Steven Luo, Copley, OH (US)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 14/380,944

(22) PCT Filed: Feb. 27, 2013

(86) PCT No.: PCT/US2013/027905
§ 371 (c)(1),
(2) Date: Aug. 26, 2014

(87) PCT Pub. No.: WO2013/130522
PCT Pub. Date: Sep. 6, 2013

(65) Prior Publication Data
US 2015/0299350 A1    Oct. 22, 2015

Related U.S. Application Data

(60) Provisional application No. 61/603,658, filed on Feb. 27, 2012.

(51) Int. Cl.
C08F 4/52       (2006.01)
C08F 136/06     (2006.01)
C08F 36/06      (2006.01)
C08F 4/54       (2006.01)

(52) U.S. Cl.
CPC .............. *C08F 136/06* (2013.01); *C08F 4/545* (2013.01); *C08F 36/06* (2013.01)

(58) Field of Classification Search
CPC ............ C08F 36/04; C08F 36/06; C08F 2/04; C08F 4/52; C08F 4/50; C08F 4/545
See application file for complete search history.

(56) References Cited

U.S. PATENT DOCUMENTS

| | | | |
|---|---|---|---|
| 3,297,667 A | 1/1967 | von Dohlen et al. | |
| 4,242,232 A | 12/1980 | Sylvester et al. | |
| 4,260,707 A | 4/1981 | Sylvester et al. | |
| 4,461,883 A | 7/1984 | Takeuchi et al. | |
| 4,533,711 A | 8/1985 | Takeuchi et al. | |
| 4,575,538 A | 3/1986 | Hsieh et al. | |
| 4,619,982 A | 10/1986 | Jenkins | |
| 4,663,405 A | 5/1987 | Throckmorton | |
| 4,696,984 A | 9/1987 | Carbonaro et al. | |
| 4,699,962 A | 10/1987 | Hsieh et al. | |
| 4,710,553 A | 12/1987 | Carbonaro et al. | |
| 4,736,001 A | 4/1988 | Carbonaro et al. | |
| 4,906,706 A | 3/1990 | Hattori et al. | |
| 4,990,573 A | 2/1991 | Andreussi et al. | |
| 5,017,539 A | 5/1991 | Jenkins et al. | |
| 5,064,910 A | 11/1991 | Hattori et al. | |
| 5,405,815 A * | 4/1995 | Bell et al. | 502/102 |
| 5,567,784 A | 10/1996 | Wieder et al. | |
| 6,255,416 B1 | 7/2001 | Sone et al. | |
| 6,384,156 B1 | 5/2002 | Bernier et al. | |
| 6,391,990 B1 | 5/2002 | Ishino et al. | |
| 6,437,205 B1 | 8/2002 | Miller et al. | |
| 6,482,930 B1 | 11/2002 | Kwag et al. | |
| 6,521,726 B1 | 2/2003 | Kimura et al. | |
| 6,897,270 B2 | 5/2005 | Ozawa et al. | |
| 7,008,899 B2 | 3/2006 | Luo et al. | |
| 7,094,849 B2 | 8/2006 | Luo et al. | |
| 7,288,611 B2 | 10/2007 | Jiang et al. | |
| 7,351,776 B2 | 4/2008 | Tartamella et al. | |
| 7,396,889 B2 | 7/2008 | Robert | |
| 7,572,867 B2 | 8/2009 | Tartamella et al. | |
| 7,594,528 B2 | 9/2009 | Sandstrom | |
| 7,741,418 B2 | 6/2010 | Luo et al. | |

(Continued)

FOREIGN PATENT DOCUMENTS

| | | |
|---|---|---|
| EP | 629640 A1 | 12/1994 |
| JP | 10-330541 A | 12/1998 |

(Continued)

OTHER PUBLICATIONS

Friebe, Lars, "Neodymium Based Ziegler/Natta Catalysts and their Application in Diane Polymerization," Advances in Polymer Science 204, pp. 1-154 (2006).

Hsieh, H.L. et al., "Polymerization of Butadiene and Isoprene with Lanthanide Catalysts; Characterization and Properties of Homopolymers and Copolymers," Rubber Chemistry and Technology, vol. 58, No. 1, pp. 117-145 (Mar. 1985).

(Continued)

*Primary Examiner* — Rip A Lee

(74) *Attorney, Agent, or Firm* — Meredith E. Hooker; Jenny L. Sheaffer

(57) ABSTRACT

Disclosed herein are solution polymerization processes for producing a high-cis polydiene. The processes include polymerizing at least one conjugated diene monomer in an organic solvent in the presence of at least one thiol compound and a lanthanide-based catalyst composition to produce a polydiene having a cis-1,4-linkage content of 90-99%. The at least one thiol compound is represented by the general formula R—S—H, where R is a hydrocarbyl group or a substituted hydrocarbyl group. The lanthanide-based catalyst composition comprises (a) a lanthanide compound, (b) an alkylating agent, and (c) a halogen source, where (c) may optionally be provided by (a), (b), or both (a) and (b). The molar ratio of the at least one thiol compound to the lanthanide compound used in the polymerization process ranges from 0.01:1 to 100:1. Improved solution polymerization processes regarding the same are also disclosed herein.

21 Claims, No Drawings

(56) References Cited

U.S. PATENT DOCUMENTS

| | | | |
|---|---|---|---|
| 7,799,725 B2 | 9/2010 | Suzuki et al. | |
| 7,807,763 B2 | 10/2010 | Smale et al. | |
| 7,825,201 B2 | 11/2010 | Luo et al. | |
| 2003/0125487 A1* | 7/2003 | Hsu | C08F 36/04 526/164 |
| 2008/0182954 A1 | 7/2008 | Luo et al. | |
| 2009/0156751 A1* | 6/2009 | Kwag | C08C 19/20 525/332.4 |
| 2010/0137520 A1 | 6/2010 | Robertson et al. | |

FOREIGN PATENT DOCUMENTS

| | | |
|---|---|---|
| KR | 10-2004-0013253 A | 2/2004 |
| KR | 10-2009-0062154 A | 6/2009 |

OTHER PUBLICATIONS

Kim, Dong Seok, International Search Report with Written Opinion from PCT/US2013/027905, 11 pp. (Jun. 18, 2013).

Quirk, R.P. et al., "Butadiene polymerization using neodymium versatate-based catalysts: catalyst optimization and effects of water and excess versatic acid," Polymer, vol. 41, pp. 5903-5908 (2000).

Shen, Zhiquan et al., "The Characteristics of Lanthanide Coordination Catalysts and the Cis-Polydienes Prepared Therewith," Journal of Polymer Science: Polymer Chemistry Edition, vol. 18, Issue 12, pp. 3345-3357 (Dec. 1980).

Communication of extended European search reported in application No. EP13755152.9, dated Jun. 11, 2015.

* cited by examiner

PROCESSES FOR THE PREPARATION OF HIGH-CIS POLYDIENES

CROSS-REFERENCE TO RELATED APPLICATION

This application claims priority to and any other benefit of U.S. Provisional Patent Application Ser. No. 61/603,658, filed Feb. 27, 2012, and entitled "PROCESSES FOR THE PREPARATION OF HIGH-CIS POLYDIENES," the entire disclosure of which is incorporated by reference herein.

FIELD OF THE INVENTION

The disclosure relates to polymerization processes for producing polydienes having a high cis-1,4-linkage content using a lanthanide-based catalyst system.

BACKGROUND

Synthetic polymers that are used in rubber compositions and that undergo strain-induced crystallization provide advantageous properties including, for example, tensile strength and abrasion resistance in the rubber composition. Polydienes with a high cis-1,4-linkage content, which exhibit the increased ability to undergo strain-induced crystallization, have been advantageously employed in tires, particularly in the tire components that benefit from such properties such as the sidewall and tread components of tires.

Lanthanide-based catalyst systems comprising a lanthanide compound, an alkylating agent, and a halogen source are useful for polymerizing conjugated diene monomers to produce polydienes having a high cis-1,4-linkage content. The polydienes with the high cis-1,4-linkage content produced with such catalyst systems have a linear backbone structure, exhibit good green strength, and have excellent viscoelastic properties. The linear backbone structure, in turn, is believed to provide excellent properties directed to improved tensile strength, increased abrasion resistance, lower hysteresis, and improved fatigue resistance in the rubber compositions formed with these polydienes. Thus, the polydienes having the high cis-1,4-linkage content produced using lanthanide-based catalyst systems are desirable for use in tires and tire components such as sidewalls and treads.

The polymerization processes disclosed herein provide certain advantages and improvements to the use of lanthanide-based catalyst systems to produce polydienes having a high cis-1,4-linkage content. As discussed herein, the present disclosure relates to using a thiol compound in combination with a lanthanide-based catalyst system to produce polydienes having a higher cis-1,4-linkage content as compared to polydienes prepared under the same polymerization conditions but without the thiol compound.

SUMMARY OF THE INVENTION

The present disclosure provides solution polymerization processes for producing a high-cis polydiene comprising polymerizing at least one conjugated diene monomer in an organic solvent in the presence of at least one thiol compound and a lanthanide-based catalyst composition to produce a polydiene having a cis-1,4-linkage content of 90-99%. The at least one thiol compound is represented by the general formula R—S—H, where R is a hydrocarbyl group or a substituted hydrocarbyl group. The lanthanide-based catalyst composition comprises (a) a lanthanide compound, (b) an alkylating agent, and (c) a halogen source, where (c) may optionally be provided by (a), (b), or both (a) and (b). The molar ratio of the at least one thiol compound to the lanthanide compound used in the polymerization processes ranges from 0.01:1 to 100:1.

Other embodiments of the present disclosure provide improved solution polymerization processes for producing a high-cis polydiene by the polymerization of at least one conjugated diene monomer in an organic solvent charged with a lanthanide-based catalyst composition. The improved processes comprise polymerizing the at least one conjugated diene monomer in the presence of at least one thiol compound in the organic solvent charged with the lanthanide-based catalyst composition to produce a polydiene having a cis-1,4-linkage content of 90-99%. The improvement is shown in the resulting polydiene, where the polydiene produced has a higher cis-1,4-linkage content compared to a polydiene produced under the same polymerization conditions but without the at least one thiol compound. In accordance with embodiments disclosed herein, the at least one thiol compound is represented by the general formula R—S—H, where R is a hydrocarbyl group or a substituted hydrocarbyl group. Also, the molar ratio of the at least one thiol compound to the lanthanide compound used in the improved polymerization processes ranges from 0.01:1 to 100:1.

Other aspects of the present disclosure will be apparent from the description that follows.

DETAILED DESCRIPTION

The present disclosure is directed to solution polymerization processes for producing high-cis polydienes from conjugated diene monomers using a lanthanide-based catalyst system in combination with a thiol compound. The lanthanide-based catalyst system comprises (a) a lanthanide compound, (b) an alkylating agent, and (c) a halogen source. A polydiene produced in accordance with the processes disclosed herein has a higher cis-1,4-linkage content as compared to a polydiene produced under the same polymerization conditions but without the thiol compound. The thiol compound acts as a catalyst modifier to increase the relative cis-1,4-linkage content of the polydiene. Thus, the use of the thiol compound with the lanthanide-based catalyst system is an improvement in the use of lanthanide-based catalyst systems to produce high-cis polydienes.

Polydienes generally contain cis-1,4-, trans-1,4-, and 1,2-linkages between monomer units. As used herein, the term "high-cis" refers to a cis-1,4-linkage content of 90-99% in the polydiene. In accordance with certain embodiments of the process disclosed herein, the resulting high-cis polydiene has a cis-1,4-linkage content of 94-99%, preferably 96-99%, and more preferably 97-99%. In accordance with one embodiment, the cis-1,4-linkage content ranges from 94% to 99%. In other embodiments, the cis-1,4-linkage content may range from 97-99%. The cis-1,4-linkage contents disclosed herein are determined by FTIR (Fourier transform infrared spectroscopy). In particular, the polymer samples are dissolved in $CS_2$ and then subjected to FTIR.

The polymerization processes described herein are solution polymerization processes. In this type of polymerization process, the polymerization reaction takes place in organic solvent-based solution. Here, that organic solvent-based solution contains at least one conjugated diene monomer, a lanthanide-based catalyst composition, and at least one thiol compound. The organic solvent-based solution comprises 20-90% by weight (wt %) organic solvent based on the total weight of the monomer, organic solvent, and polydiene in the solution. Preferably, the organic solvent comprises the predominant component of the solution, i.e., 50-90 wt % organic solvent, and more preferably 70 wt % to 90 wt % organic solvent based on the total weight of the monomer, organic solvent, and polydiene. The solution polymerization processes disclosed herein can be contrasted with gas-type or bulk-type polymerizations, where polymerization is carried out in the absence of any organic solvent or where there is less than 20 wt % organic solvent present based on the total weight of the monomer, organic solvent, and polydiene.

Suitable organic solvents for use in the solution polymerization processes described herein are those solvents that are inert to the polymerization reaction such that the solvent is not a reactant in the polymerization reaction. Suitable organic solvents include aromatic hydrocarbons, aliphatic hydrocarbons, and cycloaliphatic hydrocarbons. Examples of suitable aromatic hydrocarbon solvents include, but are not limited to benzene, toluene, ethylbenzene, diethylbenzene, naphthalenes, mesitylene, xylenes, and the like. Examples of suitable aliphatic hydrocarbon solvents include, but are not limited to, n-pentane, n-hexane, n-heptane, n-octane, n-nonane, n-decane, isopentane, hexanes, isohexanes, isopentanes, isooctanes, 2,2-dimethylbutane, petroleum ether, kerosene, petroleum spirits, and the like. Non-limiting examples of suitable cycloaliphatic hydrocarbon solvents include cyclopentane, cyclohexane, methylcyclopentane, methylcyclohexane, and the like. Mixtures of the foregoing aromatic hydrocarbon solvents, aliphatic hydrocarbon solvents, and cycloaliphatic hydrocarbon solvents can also be used. In certain embodiments, the preferred organic solvent includes an aliphatic hydrocarbon solvent, a cycloaliphatic hydrocarbon solvent, or mixtures thereof. Additional useful organic solvents suitable for use in the processes disclosed herein are known to those skilled in the art.

The monomer used in accordance with the polymerization processes described herein is a conjugated diene monomer. A conjugated diene monomer is a hydrocarbon compound that contains at least two double bonds that are separated by a single bond. Suitable conjugated diene monomers used with the solution polymerization processes generally include hydrocarbon compounds containing less than 20 carbon atoms. Non-limiting examples of such suitable conjugated diene monomers include 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, 2,4-hexadiene, and combinations thereof. In accordance with one embodiment, the polymerization processes disclosed herein utilize at least one conjugated diene to form a high-cis polydiene. In certain embodiments, the polymerization processes disclosed herein can be utilized for the copolymerization of two or more conjugated dienes to form copolymers having a cis-1,4-microstructure. In accordance with other embodiments, the conjugated diene monomer is 1,3-butadiene, resulting in a high-cis polybutadiene after polymerization. Additional useful conjugated diene monomers suitable for use in the processes disclosed herein are known to those skilled in the art.

The thiol compound is used as a catalyst modifier to increase the cis-1,4-linkage content of polydienes produced using a lanthanide-based catalyst composition system. In accordance with the polymerization processes disclosed herein, the lanthanide-based catalyst composition comprises (a) a lanthanide compound, i.e., a lanthanide-containing compound, (b) an alkylating agent, and (c) a halogen source. In such catalyst system, the halogen source may optionally be provided by the lanthanide compound, the alkylating agent, or both the lanthanide compound and the alkylating agent. In other words, in certain embodiments, there may be no separate (c) component.

As mentioned above, the lanthanide-based catalyst composition system employed in the polymerization processes includes a lanthanide compound. Lanthanide compounds useful in the polymerization processes disclosed herein are those compounds that include at least one atom of a lanthanide element. As used herein, "lanthanide element" refers the elements found in the lanthanide series of the Periodic Table (i.e., element numbers 57-71) as well as didymium, which is a mixture of rare-earth elements obtained from monazite sand. In particular, the lanthanide elements as disclosed herein include lanthanum, neodymium, cerium, praseodymium, promethium, samarium, europium, gadolinium, terbium, dysprosium, holmium, erbium, thulium, ytterbium, lutetium, and didymium. Preferably, the lanthanide compound includes at least one atom of neodymium, gadolinium, samarium, or combinations thereof.

The lanthanide atom in the lanthanide compound can be in various oxidation states including, but not limited to, the 0, +2, +3, and +4 oxidation states. In accordance with certain embodiments of the polymerization processes disclosed herein, a trivalent lanthanide compound, where the lanthanide atom is in the +3 oxidation state, is used. Generally, suitable lanthanide compounds for use in the polymerization processes disclosed herein include, but are not limited to, lanthanide carboxylates, lanthanide organophosphates, lanthanide organophosphonates, lanthanide organophosphinates, lanthanide carbamates, lanthanide dithiocarbamates, lanthanide xanthates, lanthanide β-diketonates, lanthanide alkoxides or aryloxides, lanthanide halides, lanthanide pseudo-halides, lanthanide oxyhalides, and organolanthanide compounds.

In accordance with certain embodiments of the polymerization processes disclosed herein, the lanthanide compounds may be soluble in hydrocarbon solvents such as the aromatic hydrocarbon solvents, aliphatic hydrocarbon solvents, or cycloaliphatic hydrocarbon solvents disclosed herein. Hydrocarbon-insoluble lanthanide compounds, however, can also be useful in the present polymerization process, as they can be suspended in the polymerization medium to form the catalytically active species.

For ease of illustration, further discussion of useful lanthanide compounds for use in the polymerization processes disclosed herein will focus on neodymium compounds, although those skilled in the art will be able to select similar compounds that are based upon the other lanthanide metals disclosed herein.

Examples of suitable neodymium carboxylates for use as the lanthanide compound in the polymerization processes disclosed herein include, but are not limited to, neodymium formate, neodymium acetate, neodymium acrylate, neodymium methacrylate, neodymium valerate, neodymium gluconate, neodymium citrate, neodymium fumarate, neodymium lactate, neodymium maleate, neodymium oxalate, neodymium 2-ethylhexanoate, neodymium neodecanoate (i.e., neodymium versatate or $NdV_3$), neodymium naphthenate, neodymium stearate, neodymium oleate, neodymium benzoate, and neodymium picolinate.

Examples of suitable neodymium organophosphates for use as the lanthanide compound in the polymerization processes disclosed herein include, but are not limited to, neodymium dibutyl phosphate, neodymium dipentyl phosphate, neodymium dihexyl phosphate, neodymium diheptyl phosphate, neodymium dioctyl phosphate, neodymium bis(1-methylheptyl)phosphate, neodymium bis(2-ethylhexyl)phosphate, neodymium didecyl phosphate, neodymium didodecyl phosphate, neodymium dioctadecyl phosphate, neodymium dioleyl phosphate, neodymium diphenyl phosphate, neodymium bis(p-nonylphenyl)phosphate, neodymium butyl(2-ethylhexyl)phosphate, neodymium(1-methylheptyl) (2-ethylhexyl)phosphate, and neodymium(2-ethylhexyl) (p-nonylphenyl)phosphate.

Examples of suitable neodymium organophosphonates for use as the lanthanide compound in the polymerization processes disclosed herein include, but are not limited to, neodymium butyl phosphonate, neodymium pentyl phosphonate, neodymium hexyl phosphonate, neodymium heptyl phosphonate, neodymium octyl phosphonate, neodymium(1-methylheptyl)phosphonate, neodymium(2-ethylhexyl)phosphonate, neodymium decyl phosphonate, neodymium dodecyl phosphonate, neodymium octadecyl phosphonate, neodymium oleyl phosphonate, neodymium phenyl phosphonate, neodymium(p-nonylphenyl)phosphonate, neodymium butyl butylphosphonate, neodymium pentyl pentylphosphonate, neodymium hexyl hexylphosphonate, neodymium heptyl heptylphosphonate, neodymium octyl octylphosphonate, neodymium(1-methylheptyl) (1-methylheptyl)phosphonate, neodymium(2-ethylhexyl) (2-ethylhexyl)phosphonate, neodymium decyl decylphosphonate, neodymium dodecyl dodecylphosphonate, neodymium octadecyl octadecylphosphonate, neodymium oleyl oleyl phosphonate, neodymium phenyl phenylphosphonate, neodymium(p-nonylphenyl) (p-nonylphenyl)phosphonate, neodymium butyl(2-ethylhexyl)phosphonate, neodymium (2-ethylhexyl)butylphosphonate, neodymium(1-methylheptyl) (2-ethylhexyl)phosphonate, neodymium(2-ethylhexyl) (1-methylheptyl)phosphonate, neodymium(2-ethylhexyl) (p-nonylphenyl)phosphonate, and neodymium(p-nonylphenyl) (2-ethylhexyl)phosphonate.

Examples of suitable neodymium organophosphinates for use as the lanthanide compound in the polymerization processes disclosed herein include, but are not limited to, neodymium butylphosphinate, neodymium pentylphosphinate, neodymium hexylphosphinate, neodymium heptylphosphinate, neodymium octylphosphinate, neodymium(1-methylheptyl)phosphinate, neodymium(2-ethylhexyl)phosphinate, neodymium decylphosphinate, neodymium dodecylphosphinate, neodymium octadecylphosphinate, neodymium oleylphosphinate, neodymium phenylphosphinate, neodymium (p-nonylphenyl)phosphinate, neodymium dibutylphosphinate, neodymium dipentylphosphinate, neodymium dihexylphosphinate, neodymium diheptylphosphinate, neodymium dioctylphosphinate, neodymium bis(1-methylheptyl)phosphinate, neodymium bis(2-ethylhexyl) phosphinate, neodymium didecylphosphinate, neodymium didodecylphosphinate, neodymium dioctadecylphosphinate, neodymium dioleylphosphinate, neodymium diphenylphosphinate, neodymium bis(p-nonylphenyl)phosphinate, neodymium butyl(2-ethylhexyl)phosphinate, neodymium(1-methylheptyl)(2-ethylhexyl)phosphinate, and neodymium(2-ethylhexyl)(p-nonylphenyl)phosphinate.

Examples of suitable neodymium carbamates for use as the lanthanide compound in the polymerization processes disclosed herein include, but are not limited to, neodymium dimethylcarbamate, neodymium diethylcarbamate, neodymium diisopropylcarbamate, neodymium dibutylcarbamate, and neodymium dibenzylcarbamate.

Examples of suitable neodymium dithiocarbamates for use as the lanthanide compound in the polymerization processes disclosed herein include, but are not limited to, neodymium dimethyldithiocarbamate, neodymium diethyldithiocarbamate, neodymium diisopropyldithiocarbamate, neodymium dibutyldithiocarbamate, and neodymium dibenzyldithiocarbamate.

Examples of suitable neodymium xanthates for use as the lanthanide compound in the polymerization processes disclosed herein include, but are not limited to, neodymium methylxanthate, neodymium ethylxanthate, neodymium isopropylxanthate, neodymium butylxanthate, and neodymium benzylxanthate.

Examples of suitable neodymium β-diketonates for use as the lanthanide compound in the polymerization processes disclosed herein include, but are not limited to, neodymium acetylacetonate, neodymium trifluoroacetylacetonate, neodymium hexafluoroacetylacetonate, neodymium benzoylacetonate, and neodymium 2,2,6,6-tetramethyl-3,5-heptanedionate.

Examples of suitable neodymium alkoxides or aryloxides for use as the lanthanide compound in the polymerization processes disclosed herein include, but are not limited to, neodymium methoxide, neodymium ethoxide, neodymium isopropoxide, neodymium 2-ethylhexoxide, neodymium phenoxide, neodymium nonylphenoxide, and neodymium naphthoxide.

Examples of suitable neodymium halides for use as the lanthanide compound in the polymerization processes disclosed herein include, but are not limited to, neodymium fluoride, neodymium chloride, neodymium bromide, and neodymium iodide. Suitable neodymium pseudo-halides include, but are not limited to, neodymium cyanide, neodymium cyanate, neodymium thiocyanate, neodymium azide, and neodymium ferrocyanide. Suitable neodymium oxyhalides include, but are not limited to, neodymium oxyfluoride, neodymium oxychloride, and neodymium oxybromide. A Lewis base, such as tetrahydrofuran ("THF"), can be employed as an aid for solubilizing this class of neodymium compounds in inert organic solvents. Where lanthanide halides, lanthanide oxyhalides, or other lanthanide compounds containing a halogen atom are used, the lanthanide compound may optionally also provide all or part of the halogen source in the lanthanide-based catalyst composition system.

As used herein, the term "organolanthanide compound" refers to any lanthanide compound containing at least one lanthanide-carbon bond. These compounds are predominantly, though not exclusively, those containing cyclopentadienyl ("Cp"), substituted cyclopentadienyl, allyl, and substituted allyl ligands. Suitable organolanthanide compounds for use as the lanthanide compound in the polymerization processes disclosed herein include, but are not limited to, $Cp_3Ln$, $Cp_2LnR$, $Cp_2LnCl$, $CpLnCl_2$, $CpLn(cyclooctatetraene)$, $(C_5Me_5)_2LnR$, $LnR_3$, $Ln(allyl)_3$, and $Ln(allyl)_2Cl$, where Ln represents a lanthanide atom, and R represents a hydrocarbyl group or a substituted hydrocarbyl group. In one or more embodiments, hydrocarbyl groups or substituted hydrocarbyl groups useful in the polymerization processes disclosed herein may contain heteroatoms such as, for example, nitrogen, oxygen, boron, silicon, sulfur, and phosphorus atoms.

As mentioned above, the lanthanide-based catalyst composition system employed in the polymerization processes disclosed herein includes an alkylating agent. In accordance with one or more embodiments of the present processes, alkylating agents, which may also be referred to as hydrocarbylating agents, include organometallic compounds that can transfer one or more hydrocarbyl groups to another metal. Generally, these agents include organometallic compounds of electropositive metals such as Groups 1, 2, and 3 metals (Groups IA, IIA, and IIIA metals). Alkylating agents useful in the polymerization processes disclosed herein include, but are not limited to, organoaluminum and organomagnesium compounds. As used herein, the term "organoaluminum compound" refers to any aluminum-containing compound having at least one aluminum-carbon bond. In one or more embodiments, organoaluminum compounds that are soluble in a hydrocarbon solvent can be used. As used herein, the term "organomagnesium compound" refers to any magnesium-containing compound having at least one magnesium-carbon bond. In one or more embodiments, organomagnesium compounds that are soluble in a hydrocarbon can be used. As will be described in more detail below, certain suitable alkylating agents may be in the form of a halide compound. Where the alkylating agent includes a halogen atom, the alkylating agent may optionally also provide all or part of the halogen source in the lanthanide-based catalyst composition system.

In one or more embodiments of the polymerization processes disclosed herein, organoaluminum compounds that are utilized include those represented by the general formula $AlR_nX_{3-n}$, where each R independently is a monovalent organic group that is attached to the aluminum atom via a carbon atom; where each X independently is a hydrogen atom, a halogen atom, a carboxylate group, an alkoxide group, or an aryloxide group; and where n is an integer in the range of from 1 to 3. In one or more embodiments, each R independently is a hydrocarbyl group or a substituted hydrocarbyl group including, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups, with each group containing from 1 carbon atom, or the appropriate minimum number of atoms to form the group, up to 20 carbon atoms. These hydrocarbyl groups or substituted hydrocarbyl groups may contain heteroatoms including, but not limited to, nitrogen, oxygen, boron, silicon, sulfur, and phosphorus atoms.

Examples of types of organoaluminum compounds for use as the alkylating agent in the polymerization processes disclosed herein that are represented by the general formula $AlR_nX_{3-n}$ include, but are not limited to, trihydrocarbylaluminum, dihydrocarbylaluminum hydride, hydrocarbylaluminum dihydride, dihydrocarbylaluminum carboxylate, hydrocarbylaluminum bis(carboxylate), dihydrocarbylaluminum alkoxide, hydrocarbylaluminum dialkoxide, dihydrocarbylaluminum halide, hydrocarbylaluminum dihalide, dihydrocarbylaluminum aryloxide, and hydrocarbylaluminum diaryloxide compounds.

Examples of suitable trihydrocarbylaluminum compounds for use as the alkylating agent in the polymerization processes disclosed herein include, but are not limited to, trimethylaluminum, triethylaluminum, triisobutylaluminum, tri-n-propylaluminum, triisopropylaluminum, tri-n-butylaluminum, tri-t-butylaluminum, tri-n-pentylaluminum, trineopentylaluminum, tri-n-hexylaluminum, tri-n-octylaluminum, tris(2-ethylhexyl)aluminum, tricyclohexylaluminum, tris(1-methylcyclopentyl)aluminum, triphenylaluminum, tri-p-tolylaluminum, tris(2,6-dimethylphenyl) aluminum, tribenzylaluminum, diethylphenylaluminum, diethyl-p-tolylaluminum, diethylbenzylaluminum, ethyldiphenylaluminum, ethyldi-p-tolylaluminum, and ethyldibenzylaluminum.

Examples of suitable dihydrocarbylaluminum hydride compounds for use as the alkylating agent in the polymerization processes disclosed herein include, but are not limited to, diethylaluminum hydride, di-n-propylaluminum hydride, diisopropylaluminum hydride, di-n-butylaluminum hydride, diisobutylaluminum hydride, di-n-octylaluminum hydride, diphenylaluminum hydride, di-p-tolylaluminum hydride, dibenzylaluminum hydride, phenylethylaluminum hydride, phenyl-n-propylaluminum hydride, phenylisopropylaluminum hydride, phenyl-n-butylaluminum hydride, phenylisobutylaluminum hydride, phenyl-n-octylaluminum hydride, p-tolylethylaluminum hydride, p-tolyl-n-propylaluminum hydride, p-tolylisopropylaluminum hydride, p-tolyl-n-butylaluminum hydride, p-tolylisobutylaluminum hydride, p-tolyl-n-octylaluminum hydride, benzylethylaluminum hydride, benzyl-n-propylaluminum hydride, benzylisopropylaluminum hydride, benzyl-n-butylaluminum hydride, benzylisobutylaluminum hydride, and benzyl-n-octylaluminum hydride.

Examples of suitable hydrocarbylaluminum dihydrides for use as the alkylating agent in the polymerization processes disclosed herein include, but are not limited to, ethylaluminum dihydride, n-propylaluminum dihydride, isopropylaluminum dihydride, n-butylaluminum dihydride, isobutylaluminum dihydride, and n-octylaluminum dihydride.

Examples of suitable dihydrocarbylaluminum halide compounds for use as the alkylating agent in the polymerization processes disclosed herein include, but are not limited to, diethylaluminum chloride, di-n-propylaluminum chloride, diisopropylaluminum chloride, di-n-butylaluminum chloride, diisobutylaluminum chloride, di-n-octylaluminum chloride, diphenylaluminum chloride, di-p-tolylaluminum chloride, dibenzylaluminum chloride, phenylethylaluminum chloride, phenyl-n-propylaluminum chloride, phenylisopropylaluminum chloride, phenyl-n-butylaluminum chloride, phenylisobutylaluminum chloride, phenyl-n-octylaluminum chloride, p-tolylethylaluminum chloride, p-tolyl-n-propylaluminum chloride, p-tolylisopropylaluminum chloride, p-tolyl-n-butylaluminum chloride, p-tolylisobutylaluminum chloride, p-tolyl-n-octylaluminum chloride, benzylethylaluminum chloride, benzyl-n-propylaluminum chloride, benzylisopropylaluminum chloride, benzyl-n-butylaluminum chloride, benzylisobutylaluminum chloride, and benzyl-n-octylaluminum chloride.

Examples of suitable hydrocarbylaluminum dihalide compounds for use as the alkylating agent in the polymerization processes disclosed herein include, but are not limited to, ethylaluminum dichloride, n-propylaluminum dichloride, isopropylaluminum dichloride, n-butylaluminum dichloride, isobutylaluminum dichloride, and n-octylaluminum dichloride.

Examples of other suitable organoaluminum compounds for use as the alkylating agent in the polymerization processes disclosed herein that are represented by the general formula $AlR_nX_{3-n}$ include, but are not limited to, dimethylaluminum hexanoate, diethylaluminum octoate, diisobutylaluminum 2-ethylhexanoate, dimethylaluminum neodecanoate, diethylaluminum stearate, diisobutylaluminum oleate, methylaluminum bis(hexanoate), ethylaluminum bis(octoate), isobutylaluminum bis(2-ethylhexanoate), methylaluminum bis (neodecanoate), ethylaluminum bis(stearate), isobutylaluminum bis(oleate), dimethylaluminum methoxide, diethylaluminum methoxide, diisobutylaluminum methoxide, dimethylaluminum ethoxide, diethylaluminum ethoxide, diisobutylaluminum ethoxide, dimethylaluminum phenoxide, diethylaluminum phenoxide, diisobutylaluminum phenoxide, methylaluminum dimethoxide, ethylaluminum dimethoxide, isobutylaluminum dimethoxide, methylaluminum diethoxide, ethylaluminum diethoxide, isobutylaluminum diethoxide, methylaluminum diphenoxide, ethylaluminum diphenoxide, and isobutylaluminum diphenoxide.

Another class of organoaluminum compounds suitable for use as an alkylating agent in the polymerization processes disclosed herein is aluminoxanes. Suitable aluminoxanes include oligomeric linear aluminoxanes, which can be represented by the general formula:

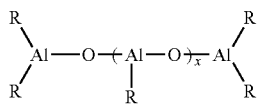

and oligomeric cyclic aluminoxanes, which can be represented by the general formula:

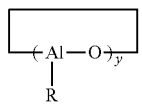

where x is an integer in the range of from 1 to 100, or 10 to 50; y is an integer in the range of from 2 to 100, or 3 to 20; and where each R independently is a monovalent organic group that is attached to the aluminum atom via a carbon atom. In one embodiment of the polymerization processes disclosed herein, each R independently is a hydrocarbyl group or a substituted hydrocarbyl group including, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups, with each group preferably containing from 1 carbon atom, or the appropriate minimum number of atoms to form the group, up to 20 carbon atoms. These hydrocarbyl groups or substituted hydrocarbyl groups may also contain heteroatoms including, but not limited to, nitrogen, oxygen, boron, silicon, sulfur, and phosphorus atoms. As used herein, the number of moles of the aluminoxane refers to the number of moles of the aluminum atoms rather than the number of moles of the oligomeric aluminoxane molecules. This convention is commonly employed in the art of catalyst systems utilizing aluminoxanes.

Aluminoxanes can be prepared by reacting trihydrocarbylaluminum compounds with water. This reaction can be performed according to known methods, such as, for example, (1) a method in which the trihydrocarbylaluminum compound is dissolved in an organic solvent and then contacted with water, (2) a method in which the trihydrocarbylaluminum compound is reacted with water of crystallization contained in, for example, metal salts, or water adsorbed in inorganic or organic compounds, or (3) a method in which the trihydrocarbylaluminum compound is reacted with water in the presence of the monomer or monomer solution that is to be polymerized.

Examples of suitable aluminoxane compounds for use as the alkylating agent in the polymerization processes disclosed herein include, but are not limited to, methylaluminoxane ("MAO"), modified methylaluminoxane ("MMAO"), ethylaluminoxane, n-propylaluminoxane, isopropylaluminoxane, butylaluminoxane, isobutylaluminoxane, n-pentylaluminoxane, neopentylaluminoxane, n-hexylaluminoxane, n-octylaluminoxane, 2-ethylhexylaluminoxane, cyclohexylaluminoxane, 1-methylcyclopentylaluminoxane, phenylaluminoxane, and 2,6-dimethylphenylaluminoxane. Modified methylaluminoxane can be formed by substituting from 20 to 80 percent of the methyl groups of methylaluminoxane with $C_2$ to $C_{12}$ hydrocarbyl groups, preferably with isobutyl groups, by using techniques known to those skilled in the art.

In accordance with certain embodiments of the polymerization processes disclosed herein, aluminoxanes can be used alone or in combination with other organoaluminum compounds. In one embodiment, methylaluminoxane and at least one organoaluminum compound other than aluminoxane, e.g., an organoaluminum compound represented by $AlR_n X_{3-n}$, are used in combination as the alkylating agent. In accordance with this and other embodiments, the alkylating agent comprises a dihydrocarbylaluminum hydride, a dihydrocarbylaluminum halide, an aluminoxane, or combinations thereof. For example, in accordance with one embodiment, the alkylating agent comprises diisobutylaluminum hydride, diethylaluminum chloride, methylaluminoxane, or combinations thereof. U.S. Pat. No. 8,017,695, which is incorporated herein by reference in its entirety, provides other examples where aluminoxanes and organoaluminum compounds can be employed in combination.

As mentioned above, suitable alkylating agents used in the present polymerization processes include organomagnesium compounds. In accordance with one or more embodiments, of the polymerization processes disclosed herein, suitable organomagnesium compounds include those represented by the general formula $MgR_2$, where each R independently is a monovalent organic group that is attached to the magnesium atom via a carbon atom. In one or more embodiments, each R independently is a hydrocarbyl group or a substituted hydrocarbyl group including, but not limited to, alkyl, cycloalkyl, substituted cycloalkyl, alkenyl, cycloalkenyl, substituted cycloalkenyl, aryl, allyl, substituted aryl, aralkyl, alkaryl, and alkynyl groups, with each group preferably containing from 1 carbon atom, or the appropriate minimum number of atoms to form the group, up to 20 carbon atoms. These hydrocarbyl groups or substituted hydrocarbyl groups may also contain heteroatoms including, but not limited to, nitrogen, oxygen, silicon, sulfur, and phosphorus atoms.

Examples of suitable organomagnesium compounds for use as the alkylating agent in the polymerization processes disclosed herein that are represented by the general formula $MgR_2$ include, but are not limited to, diethylmagnesium, di-n-propylmagnesium, diisopropylmagnesium, dibutylmagnesium, dihexylmagnesium, diphenylmagnesium, and dibenzylmagnesium.

Another class of organomagnesium compounds suitable for use as an alkylating agent in accordance with embodiments of the polymerization processes disclosed herein is represented by the general formula RMgX, where R is a monovalent organic group that is attached to the magnesium atom via a carbon atom, and X is a hydrogen atom, a halogen atom, a carboxylate group, an alkoxide group, or an aryloxide group. In one or more embodiments, R is a hydrocarbyl group or a substituted hydrocarbyl group including, but not limited to, alkyl, cycloalkyl, substituted cycloalkyl, alkenyl, cycloalkenyl, substituted cycloalkenyl, aryl, allyl, substituted aryl, aralkyl, alkaryl, and alkynyl groups, with each group containing from 1 carbon atom, or the appropriate minimum number of atoms to form the group, up to 20 carbon atoms. These hydrocarbyl groups or substituted hydrocarbyl groups may also contain heteroatoms including, but not limited to, nitrogen, oxygen, boron, silicon, sulfur, and phosphorus atoms. In one embodiment, X is a carboxylate group, an alkoxide group, or an aryloxide group, with each group containing from 1 carbon atom up to 20 carbon atoms.

Examples of suitable types of organomagnesium compounds for use as the alkylating agent in the polymerization processes disclosed herein that are represented by the general formula RMgX include, but are not limited to, hydrocarbylmagnesium hydride, hydrocarbylmagnesium halide, hydrocarbylmagnesium carboxylate, hydrocarbylmagnesium alkoxide, and hydrocarbylmagnesium aryloxide.

Examples of suitable organomagnesium compounds for use as the alkylating agent in the polymerization processes disclosed herein represented by the general formula RMgX include, but are not limited to, methylmagnesium hydride, ethylmagnesium hydride, butylmagnesium hydride, hexylmagnesium hydride, phenylmagnesium hydride, benzylmagnesium hydride, methylmagnesium chloride, ethylmagnesium chloride, butylmagnesium chloride, hexylmagnesium chloride, phenylmagnesium chloride, benzylmagnesium chloride, methylmagnesium bromide, ethylmagnesium bromide, butylmagnesium bromide, hexylmagnesium bromide, phenylmagnesium bromide, benzylmagnesium bromide, methylmagnesium hexanoate, ethylmagnesium hexanoate, butylmagnesium hexanoate, hexylmagnesium hexanoate, phenylmagnesium hexanoate, benzylmagnesium hexanoate, methylmagnesium ethoxide, ethylmagnesium ethoxide, butylmagnesium ethoxide, hexylmagnesium ethoxide, phenylmagnesium ethoxide, benzylmagnesium ethoxide, methylmagnesium phenoxide, ethylmagnesium phenoxide, butylmagnesium phenoxide, hexylmagnesium phenoxide, phenylmagnesium phenoxide, and benzylmagnesium phenoxide.

As mentioned above, the lanthanide-based catalyst systems employed in the polymerization processes disclosed herein include a halogen source. As used herein, the term "halogen source" refers to any substance including at least one halogen atom. In accordance with one or more embodiments of the polymerization processes disclosed herein, all or part of the halogen source may optionally be provided by the lanthanide compound, the alkylating agent, or both the lanthanide compound and the alkylating agent. In other words, the lanthanide compound may serve as both the lanthanide compound and all or at least a portion of the halogen source. Similarly, the alkylating agent may serve as both the alkylating agent and all or at least a portion of the halogen source.

In accordance with certain embodiments of the polymerization processes disclosed herein, at least a portion of the halogen source may be present in the catalyst system in the form of a separate and distinct halogen-containing compound. Various compounds, or mixtures thereof, that contain one or more halogen atoms can be used as the halogen source. Examples of halogen atoms include, but are not limited to, fluorine, chlorine, bromine, and iodine. A combination of two or more halogen atoms can also be utilized. Halogen-containing compounds that are soluble in an organic solvent, such as the aromatic hydrocarbon, aliphatic hydrocarbon, and cycloaliphatic hydrocarbon solvents disclosed herein, are suitable for use as the halogen source in the polymerization processes disclosed herein. In addition, hydrocarbon-insoluble halogen-containing compounds that can be suspended in a polymerization system to form the catalytically active species are also useful in certain embodiment of the polymerization processes disclosed herein.

Examples of suitable types of halogen-containing compounds for use in the polymerization processes disclosed herein include, but are not limited to, elemental halogens, mixed halogens, hydrogen halides, organic halides, inorganic halides, metallic halides, and organometallic halides.

Examples of elemental halogens suitable for use as the halogen source in the polymerization processes disclosed herein include, but are not limited to, fluorine, chlorine, bromine, and iodine. Some specific examples of suitable mixed halogens include, but are not limited to, iodine monochloride, iodine monobromide, iodine trichloride, and iodine pentafluoride.

Examples of suitable hydrogen halides for use as the halogen source in the polymerization processes disclosed herein include, but are not limited to, hydrogen fluoride, hydrogen chloride, hydrogen bromide, and hydrogen iodide.

Examples of suitable organic halides for use as the halogen source in the polymerization processes disclosed herein include, but are not limited to, t-butyl chloride, t-butyl bromide, allyl chloride, allyl bromide, benzyl chloride, benzyl bromide, chloro-di-phenylmethane, bromo-di-phenylmethane, triphenylmethyl chloride, triphenylmethyl bromide, benzylidene chloride, benzylidene bromide, methyltrichlorosilane, phenyltrichlorosilane, dimethyldichlorosilane, diphenyldichlorosilane, trimethylchlorosilane, benzoyl chloride, benzoyl bromide, propionyl chloride, propionyl bromide, methyl chloroformate, and methyl bromoformate.

Examples of suitable inorganic halides for use as the halogen source in the polymerization processes disclosed herein include, but are not limited to, phosphorus trichloride, phosphorus tribromide, phosphorus pentachloride, phosphorus oxychloride, phosphorus oxybromide, boron trifluoride, boron trichloride, boron tribromide, silicon tetrafluoride, silicon tetrachloride, silicon tetrabromide, silicon tetraiodide, arsenic trichloride, arsenic tribromide, arsenic triiodide, selenium tetrachloride, selenium tetrabromide, tellurium tetrachloride, tellurium tetrabromide, and tellurium tetraiodide.

Examples of suitable metallic halides for use as the halogen source in the polymerization processes disclosed herein include, but are not limited to, tin tetrachloride, tin tetrabromide, aluminum trichloride, aluminum tribromide, antimony trichloride, antimony pentachloride, antimony tribromide, aluminum triiodide, aluminum trifluoride, gallium trichloride, gallium tribromide, gallium triiodide, gallium trifluoride, indium trichloride, indium tribromide, indium triiodide, indium trifluoride, titanium tetrachloride, titanium tetrabromide, titanium tetraiodide, zinc dichloride, zinc dibromide, zinc diiodide, and zinc difluoride.

Examples of suitable organometallic halides for use as the halogen source in the polymerization processes disclosed herein include, but are not limited to, dimethylaluminum chloride, diethylaluminum chloride, dimethylaluminum bromide, diethylaluminum bromide, dimethylaluminum fluoride, diethylaluminum fluoride, methylaluminum dichloride, ethylaluminum dichloride, methylaluminum dibromide, ethylaluminum dibromide, methylaluminum difluoride, ethylaluminum difluoride, methylaluminum sesquichloride, ethylaluminum sesquichloride, isobutylaluminum sesquichloride, methylmagnesium chloride, methylmagnesium bromide, methylmagnesium iodide, ethylmagnesium chloride, ethylmagnesium bromide, butylmagnesium chloride, butylmagnesium bromide, phenylmagnesium chloride, phenylmagnesium bromide, benzylmagnesium chloride, trimethyltin chloride, trimethyltin bromide, triethyltin chloride, triethyltin bromide, di-t-butyltin dichloride, di-t-butyltin dibromide, dibutyltin dichloride, dibutyltin dibromide, tributyltin chloride, and tributyltin bromide. In accordance with one embodiment, the halogen source comprises an organometallic halide. For example, in accordance with certain embodiments, the halogen source comprises diethylaluminum chloride, which as mentioned above can also serve as an alkylating agent in the lanthanide-based catalyst system. Thus, in accordance with certain embodiments, the halogen source may be provided in all or in part by the alkylating agent in the catalyst systems disclosed herein.

The lanthanide-based catalyst composition used in this polymerization processes disclosed herein may be formed by combining or mixing the foregoing catalyst ingredients. The terms "catalyst composition" and "catalyst system," as referred to herein, encompass a simple mixture of the ingredients, a complex of the various ingredients that is caused by physical or chemical forces of attraction, a chemical reaction product of the ingredients, or a combination of the foregoing. The terms "catalyst composition" and "catalyst system" can be used interchangeably herein.

As mentioned above, a thiol compound is used as a catalyst modifier to increase the cis-1,4-linkage content of polydienes produced using a lanthanide-based catalyst system. A polydiene prepared using at least one thiol compound in accordance with the polymerization processes disclosed herein will have a higher cis-1,4-linkage content than a polydiene prepared under the same polymerization conditions, i.e., the same reaction ingredients and reaction conditions, but without the thiol compound. Thus, the polymerization processes disclosed herein are an improvement over polymerization processes that produce high-cis polydienes using lanthanide-based catalyst systems without the thiol compound.

In accordance with the polymerization processes described herein, the thiol compound is represented by the general formula R—S—H, where R is a hydrocarbyl group or a substituted hydrocarbyl group. The practice of the polymerization processes disclosed herein is not limited to thiol compounds having any particular size or type of R, i.e., hydrocarbyl group or substituted hydrocarbyl group. For example, non-limiting examples of types of R include alkyl, cycloalkyl, substituted cycloalkyl, alkenyl, cycloalkenyl, substituted cycloalkenyl, alkynyl, allyl, aryl, substituted aryl, aralkyl, and alkaryl groups. R preferably has 100 carbon atoms or less (e.g., 4-100 carbon atoms), more preferably 30 carbon atoms or less, and even more preferably from 4 to 30 carbon atoms. Further, in one or more embodiments, the hydrocarbyl groups or substituted hydrocarbyl groups useful in the thiol compounds disclosed herein may contain heteroatoms such as, for example, nitrogen, oxygen, silicon, sulfur, and phosphorus atoms. In certain embodiments, the substituted hydrocarbyl groups may include, but are not limited to, halo-substituted or amino-substituted hydrocarbyl groups.

Examples of suitable types of thiol compounds useful in the polymerization processes disclosed herein and represented by the general formula R—S—H include, but are not limited to, alkanethiols, substituted alkanethiols, cycloalkanethiols, substituted cycloalkanethiols, alkenethiols, substituted alkenethiols, cycloalkenethiols, substituted cycloalkenethiols, arenethiols, substituted arenethiols, aralkanethiols, alkarenethiols, and the like.

Examples of suitable alkanethiols for use as the thiol compound in the polymerization processes disclosed herein include, but are not limited to, methanethiol; ethanethiol; propanethiols such as 1-propanethiol (n-propyl mercaptan) and 2-propanethiol; butanethiols such as 1-butanethiol (n-butyl mercaptan) and 2-methylpropane-2-thiol (t-butyl mercaptan); pentanethiols such as 1-pentanethiol, 2-pentanethiol, 3-pentanethiol, and t-pentanethiol (t-pentyl mercaptan); hexanethiols such as 1-hexanethiol; heptanethiols such as 1-heptanethiol (n-heptyl mercaptan) and 2-heptanethiol; octanethiols such as 1-octanethiol (n-octyl mercaptan), 2-ethylhexanethiol, and 2,4,4-trimethyl-2-pentanethiol (t-octyl mercaptan); nonanethiols such as 1-nonanethiol (n-nonyl mercaptan) and t-nonanethiol (t-nonyl mercaptan); decanethiols such as 1-decanethiol; undecanethiols such as 1-undecanethiol; dodecanethiols such as 1-dodecanethiol and t-dodecanethiol (t-dodecyl mercaptan); tridecanethiols; tetradecanethiols such as 1-tetradecanethiol; pentadecanethiols such as 1-pentadecanethiol; hexadecanethiols such as 1-hexadecanethiol; heptadecanethiols; octadecanethiols such as 1-octadecanethiol; nonadecanthiols; eicosanethiols; triacontanethiols; tetracontanethiols; pentacontanethiols; hexacontanethiols; heptacontanethiols; octacontanethiols; nonacontanethiols; hectanethiols; and the like.

Examples of suitable cycloalkanethiols for use as the thiol compound in the polymerization processes disclosed herein include, but are not limited to, cyclopropanethiol, cyclobutanethiol, cyclopentanethiol, cyclohexanethiol, cycloheptanethiol, cyclooctanethiol, cyclononanethiol, cyclodecanethiol, 1-adamantanethiol, and the like.

Examples of suitable substituted cycloalkanethiols for use as the thiol compound in the polymerization processes disclosed herein include, but are not limited to, halo-substituted cycloalkanethiols such as 4-fluorocyclohexanethiol, amino-substituted cycloalkanethiols such as 3-dimethylaminocyclohexanethiol, and the like.

Examples of suitable alkenethiols for use as the thiol compound in the polymerization processes disclosed herein include, but are not limited to, propenethiols such as 2-propene-1-thiol, butenethiols such as 3-butene-1-thiol, pentenethiols such as 4-pentene-1-thiol, octadecenethiols such as cis-9-octadecene-1-thiol, and the like.

Examples of suitable cycloalkenethiols for use as the thiol compound in the polymerization processes disclosed herein include, but are not limited to, cyclopentenethiols, cyclohexenethiols, and the like.

Examples of suitable substituted cycloalkenethiols include, but are not limited to, alkylcycloalkenethiols such as 4-trifluoromethyl-3-cyclohexene-1-thiol.

Examples of suitable arenethiols for use as the thiol compound in the polymerization processes disclosed herein include, but are not limited to, benzenethiol; naphthalenethiols such as 1-naphthalenethiol; terphenylthiols such as 1,1', 4',1"-terphenyl-4-thiol; and the like.

Examples of suitable substituted arenethiols for use as the thiol compound in the polymerization processes disclosed herein include, but are not limited to, alkyl-substituted benzenethiols such as methylbenzenethiols, ethylbenzenethiols, propylbenzenethiols, butylbenzenethiols, and the like; polyalkyl-substituted benezenethiols, i.e., benzenethiols having 2 or more alkyl groups; halo-substituted benzenethiols such as 2-fluorothiophenol; amino substituted arenethiols such as 3-aminobenzenethiol; and the like. Non-limiting examples of suitable methylbenzenethiols include 2-methylbenzenethiol, 3-methylbenzenethiol, and 4-methylbenzenethiol.

Examples of suitable aralkanethiols for use as the thiol compound in the polymerization processes disclosed herein include, but are not limited to, phenylalkanethiols such as phenylmethanethiol (phenylmethyl mercaptan), phenylethanethiol (phenylethyl mercaptan), phenylpropanethiols such as 3-phenyl-1-propanethiol, phenylbutanethiols, and the like.

In accordance with one or more embodiments of the polymerization processes disclosed herein, the thiol compound is selected from the group consisting of ethanethiol, propanethiols, butanethiols, pentanethiols, hexanethiols, heptanethiols, octanethiols, nonanethiols, decanethiols, dodecanethiols, tridecanethiols, tetradecanethiols, pentadecanethiols, hexadecanethiols, heptadecanethiols, octadecanethiols, nonadecanthiols, eicosanethiols, triacontanethiols, benzenethiol, alkyl-substituted benzenethiols, and combinations thereof.

In accordance with preferred embodiments of the polymerization processes disclosed herein, the thiol compound used is a tertiary thiol. As used herein, "tertiary thiol" refers to a thiol compound that has the thiol group located adjacent to the tertiary conformation of an alkyl group. Suitable tertiary thiols are represented by the general formula (R')(R")(R''')C—S—H, where each of R', R", and R''' are hydrocarbyl or substituted hydrocarbyl groups. In accordance with this general formula, each of R', R", and R''' are bonded to the carbon atom, C, which is in turn bonded to the sulfur atom in the thiol group, S—H. Preferably, in accordance with the thiol compounds disclosed herein, the tertiary thiol has 100 total carbons or less, more preferably 30 carbon atoms or less, and even more preferably from 4 to 30 carbon atoms. One skilled in the art would recognize tertiary thiols include several thiol compounds disclosed above. Non-limiting examples of suitable tertiary thiols include 2-methylpropane-2-thiol (t-butyl mercaptan), t-pentanethiol (t-pentyl mercaptan), 2,4,4-trimethyl-2-pentanethiol (t-octyl mercaptan), t-nonanethiol (t-nonyl mercaptan), t-dodecanethiol (t-dodecyl mercaptan), and the like. Additional tertiary thiols that may be useful in the practice of the polymerization processes disclosed herein may occur to those of skill in the art.

Without intending to be limited by any theory, it is believed that the steric hindrance caused by the tertiary thiol improves the stereospecificity of the polymerization processes using the lanthanide-based catalyst system because it produces polydienes with a higher cis content than the same process that uses non-tertiary thiols, e.g., primary or secondary thiols. For example, Examples 2-6 disclosed herein and summarized in Table 1 use a tertiary thiol (t-dodecanethiol) as the thiol compound. Examples 8-10 disclosed herein and summarized in Table 2 use 1-dodecanethiol. These two respective thiol compounds are different isomers of a 12 carbon thiol compound. Examples 6 and 8 use the same molar ratio of thiol compound to neodymium and therefore provide the basis for comparison between the two 12 carbon thiols, one tertiary and one non-tertiary. As shown in Example 6 of Table 1, the use of the t-dodecanethiol results in a higher cis-1,4-linkage content compared to its control (Example 1) than that of Example 8 shown in Table 2 compared to its control (Example 7). The difference between the cis content in the polydiene of Example 6 compared to the control polydiene of Example 1 is 3.58% (=98.07%-94.49%) as compared to the difference between the cis content in the polydiene of Example 8 compared to the control polydiene of Example 7 of 0.07% (=94.64%-94.57%).

The solution polymerization processes disclosed herein are preferably conducted under anaerobic conditions under a blanket of inert gas, such as nitrogen, argon, or helium. The polymerization temperature may vary widely, ranging from −50° C. to 150° C., with the preferred temperature range being 50° C. to 120° C. The polymerization pressure may also vary widely, ranging from 1 atmosphere (atm) to 30 atm, preferably 1 atm to 10 atm.

The solution polymerization processes disclosed herein are conducted as a continuous, a semi-continuous, or a batch process. In the semi-continuous process, the monomer is intermittingly charged to replace the monomer that has already polymerized. The polymerization of a conjugated diene monomer into a high-cis polydiene in accordance with the processes described herein occurs when the monomer, the thiol compound, and the lanthanide-based catalyst composition are all present in the organic solvent-based solution. The order of addition of the monomer, thiol compound, and catalyst to the organic solvent does not matter. However, the process is more effective, i.e., a higher cis-1,4-linkage content is obtained, when the lanthanide-based catalyst composition is added at the same time or shortly after the thiol compound has been added to the polymerization solution. In a preferred embodiment, the lanthanide-based catalyst composition is added after the thiol compound has been added to the polymerization solution.

The polymerization processes disclosed herein can be stopped by adding any suitable terminating agent. Non-limiting examples of suitable terminating agents include protic compounds, such as alcohols, carboxylic acids, inorganic acids, water, and mixtures thereof. The polymerization process disclosed herein also can be stopped by a functionalizing agent. Functionalizing agents include compounds or reagents that can react with a reactive polymer produced by the polymerization processes disclosed herein and thereby provide the polymer with a functional group. Other suitable terminating agents are known to those skilled in the art. Furthermore, once the polymerization has been stopped, the resulting high-cis polydiene can be recovered from the solution using conventional methods, e.g., steam desolventization, coagulation with an alcohol, filtration, purification, drying, etc., known to those skilled in the art.

In the polymerization processes disclosed herein, the molar ratio of the thiol compound to the lanthanide compound, i.e., part (a) of the lanthanide-based catalyst composition, ranges from 0.01:1 to 100:1. In certain embodiments, the ratio is preferably from 0.2:1 to 12:1.

In certain embodiments, the number average molecular weight ("$M_n$") of the high-cis polydienes resulting from the polymerization processes disclosed herein ranges from 20,000 to 250,000; in other embodiments from 70,000 to 130,000; and in other embodiments from 80,000 to 120,000 as determined by gel permeation chromatography ("GPC"). The GPC measurements disclosed herein are calibrated with polystyrene standards and Mark-Houwink constants for the high-cis polydienes produced.

In certain embodiments, the weight average molecular weight ("$M_w$") of the resulting high-cis polydienes resulting from the polymerization processes disclosed herein ranges from 30,000 to 600,000; from 160,000 to 240,000; and in other embodiments from 170,000 to 230,000 as determined by GPC.

In certain embodiments, the polydispersity ($M_w/M_n$) of the polydienes resulting from the polymerization processes disclosed herein ranges from 1.5 to 3.5, and in other embodiments ranges from 1.8 to 2.5.

In certain embodiments, the high-cis polydienes resulting from the polymerization processes described herein have a Mooney viscosity ("$ML_{1+4}$") ranging from 5 to 85, preferably from 25 to 50. The Mooney viscosities disclosed herein are determined at 100° C. by a Alpha Technologies Mooney viscometer with a large rotor, a one minute warm-up time, and a four minute running time.

The high-cis polydienes resulting from the polymerization processes disclosed herein are useful in rubber compositions such as those that may ultimately be used in tire components. The high-cis polydienes have tensile, abrasion resistance, rolling resistance, and fatigue resistance properties that are desirable in rubber compositions used in tire components, particularly in the rubber compositions used in the tread or the sidewall components of tires. As is known to those skilled in the art, the high-cis polydienes resulting from the polymerization processes disclosed herein can be used alone or in combination with other rubbery polymers, including natural or synthetic elastomers to produce such rubber compositions useful for tire components. Synthetic elastomers can be derived from the polymerization of one or more different types of conjugated diene monomers or the copolymerization of conjugated diene monomers with other monomers such as vinyl-substituted aromatic monomers.

The solution polymerization processes disclosed herein produce a high-cis polydiene by polymerizing at least one conjugated diene monomer in an organic solvent in the presence of at least one thiol compound and a lanthanide-based catalyst composition to produce a polydiene having a cis-1,4-linkage content of 90-99%. The at least one thiol compound is represented by the general formula R—S—H, where R is a hydrocarbyl group or a substituted hydrocarbyl group. The lanthanide-based catalyst composition comprises (a) a lanthanide compound, (b) an alkylating agent, and (c) a halogen source, where (c) may optionally be provided by (a), (b), or both (a) and (b). The molar ratio of the at least one thiol compound to the lanthanide compound used in the polymerization process ranges from 0.01:1 to 100:1.

In accordance with certain embodiments, the processes further comprises adding the at least one thiol compound to a mixture of the at least one conjugated diene monomer and the organic solvent prior to adding the lanthanide-based catalyst composition to the mixture.

Furthermore, in certain of the preceding embodiments, the at least one thiol compound is selected from the group consisting of ethanethiol, propanethiols, butanethiols, pentanethiols, hexanethiols, heptanethiols, octanethiols, nonanethiols, decanethiols, dodecanethiols, tridecanethiols, tetradecanethiols, pentadecanethiols, hexadecanethiols, heptadecanethiols, octadecanethiols, nonadecanthiols, eicosanethiols, triacontanethiols, benzenethiol, alkyl-substituted benzenethiols, and combinations thereof. In certain of the preceding embodiments, the at least one thiol compound comprises a tertiary thiol.

Moreover, in certain of the preceding embodiments, the molar ratio of the at least one thiol compound to the lanthanide compound ranges from 0.2:1 to 12:1. In certain of the preceding embodiments, the lanthanide compound is selected from the group consisting of lanthanide carboxylates, lanthanide organophosphates, lanthanide organophosphonates, lanthanide organophosphinates, lanthanide carbamates, lanthanide dithiocarbamates, lanthanide xanthates, lanthanide β-diketonates, lanthanide alkoxides or aryloxides, lanthanide halides, lanthanide pseudo-halides, lanthanide oxyhalides, organolanthanide compounds, and combinations thereof. The lanthanide portion of the lanthanide compound is selected from the group consisting of lanthanum, cerium, praseodymium, neodymium, promethium, samarium, europium, gadolinium, terbium, dysprosium, holmium, erbium, thulium, ytterbium, lutetium, didymium, and combinations thereof.

Moreover, in certain of the preceding embodiments, the alkylating agent includes at least one organoaluminum compound, at least one organomagnesium compound, or combinations thereof. Further to this and all preceding embodiments, the at least one organoaluminum compound is selected from the group consisting of an aluminoxane, a compound represented by the general formula $AlR_nX_{3-n}$, and combinations thereof, where R is a monovalent organic group attached to the aluminum atom via a carbon atom; X is a hydrogen atom, a halogen atom, a carboxylate group, an alkoxide group, or an aryloxide group; and n is from 1 to 3. Further to this and all preceding embodiments, the alkylating agent includes at least one aluminoxane and at least one organoaluminum compound other than aluminoxane.

In certain of the preceding embodiments, the halogen source includes an elemental halogen, a mixed halogen, a hydrogen halide, an organic halide, an inorganic halide, a metallic halide, an organometallic halide, or combinations thereof. Further to this and all preceding embodiments, the at least one conjugated diene monomer used in the polymerization process is a monomer selected from the group consisting of 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, 2,4-hexadiene, and combinations thereof.

As previously mentioned, embodiments of the polymerization processes disclosed herein take place in a solution containing a molar ratio from 0.01:1 to 100:1 of thiol compound to lanthanide compound and the resulting polydiene has a cis-1,4-linkage content of 90-99%. In certain of these embodiments, any or all of the following (i)-(v) also apply: (i) the polymerization process takes place at 50° C. to 120° C.; (ii) the polydiene has a polydispersity value of 1.5 to 3.5; (iii) the polydiene has between 94-99% cis-1,4-linkage content, (iv) the polydiene is polybutadiene; and (v) the polymerization takes place in the presence of 20-90 wt % or solvent based on the total weight of the monomer, organic solvent, and polydiene. Further in accordance with certain of the preceding embodiments, the polymerization takes place in the presence of 70-90 wt % organic solvent based on the total weight of the monomer, organic solvent, and polydiene.

In certain embodiments, the solution polymerization process is an improvement to producing a high-cis polydiene by polymerizing at least one conjugated diene monomer in an organic solvent charged with a lanthanide-based catalyst composition. The improvement is directed to the use of at least one thiol compound in the polymerization process. Restated, the improvement comprises polymerizing the at least one conjugated diene monomer in the presence of at least one thiol compound in the organic solvent charged with the lanthanide-based catalyst composition to produce a polydiene having a cis-1,4-linkage content of 90-99%. The improvement is shown in the resulting polydiene, where the polydiene produced has a higher cis-1,4-linkage content compared to a polydiene produced under the same polymerization conditions but without the at least one thiol compound. In accordance with the present embodiment, the at least one thiol compound is represented by the general formula R—S—H, where R is a hydrocarbyl group or a substituted hydrocarbyl group. Also, the molar ratio of the at least one thiol compound to the lanthanide compound used in embodiments of the improved polymerization process ranges from 0.01:1 to 100:1.

In certain embodiments, the improvement, i.e., the improved process, further comprises adding the at least one thiol compound to a mixture of the at least one conjugated diene monomer and the organic solvent prior to charging the mixture with the lanthanide-based catalyst composition.

Moreover, in certain embodiments, the at least one thiol compound is selected from the group consisting of ethanethiol, propanethiols, butanethiols, pentanethiols, hexanethiols, heptanethiols, octanethiols, nonanethiols, decanethiols, dodecanethiols, tridecanethiols, tetradecanethiols, pentadecanethiols, hexadecanethiols, heptadecanethiols, octadecanethiols, nonadecanthiols, eicosanethiols, triacontanethiols, benzenethiol, alkyl-substituted benzenethiols, and combinations thereof. Further in certain embodiments, the at least one thiol compound comprises a tertiary thiol.

Moreover, in certain of the preceding embodiments, the lanthanide-based catalyst composition comprises (a) a lanthanide compound, (b) an alkylating agent, and (c) a halogen source, where (c) may optionally be provided by (a), (b), or both (a) and (b). In certain embodiments, the molar ratio of the at least one thiol compound to the lanthanide compound ranges from 0.2:1 to 12:1.

In certain embodiments, the lanthanide compound is selected from the group consisting of lanthanide carboxylates, lanthanide organophosphates, lanthanide organophosphonates, lanthanide organophosphinates, lanthanide carbamates, lanthanide dithiocarbamates, lanthanide xanthates, lanthanide β-diketonates, lanthanide alkoxides or aryloxides, lanthanide halides, lanthanide pseudo-halides, lanthanide oxyhalides, organolanthanide compounds, and combinations thereof. Further in certain embodiments, the alkylating agent includes at least one aluminoxane and at least one organoaluminum compound other than aluminoxane.

Furthermore, in accordance with certain embodiments, the halogen source includes an elemental halogen, a mixed halogen, a hydrogen halide, an organic halide, an inorganic halide, a metallic halide, an organometallic halide, or combinations thereof.

As previously mentioned, embodiments of the improved polymerization processes disclosed herein take place in a solution containing a molar ratio from 0.01:1 to 100:1 of thiol compound to lanthanide compound and the resulting polydiene has a cis-1,4-linkage content of 90-99%. In certain of these embodiments, any or all of the following (i)-(v) also apply: (i) the polymerization process takes place at 50° C. to 120° C.; (ii) the polydiene has a polydispersity value of 1.5 to 3.5; (iii) the polydiene has between 94-99% cis-1,4-linkage content; (iv) the polydiene is polybutadiene; and (v) the polymerization takes place in the presence of 20-90 wt % organic solvent based on the total weight of the monomer, organic solvent, and polydiene. Further in accordance with certain embodiments, the polymerization takes place in the presence of 70-90 wt % organic solvent based on the total weight of the monomer, organic solvent, and polydiene.

Moreover, in accordance with certain embodiments, the at least one thiol compound used in the improved polymerization process is a t-dodecanethiol (t-dodecyl mercaptan), and the cis-1,4-linkage content of the polydiene produced is at least 1.0 percentage point higher (e.g., 0.05-5.0 higher) compared to the cis-1,4-linkage content of a polydiene produced under the same polymerization conditions but without the at least one thiol compound. In other embodiments, the polydiene product has a cis-1,4-linkage content that is at least 2.0 percentage points higher (e.g., 2.0-5.0) than a polydiene produced under the same polymerization conditions but without the at least one thiol compound. In other embodiments, the polydiene product has a cis-1,4-linkage content that is at least 3.0 percentage points higher (e.g., 3.0-5.0 higher) than a polydiene produced under the same polymerization conditions but without the at least one thiol compound.

It should also be understand that encompassed within the present disclosure is a rubber composition (i.e., high-cis polydiene) produced by a process according to the processes described herein. In certain such embodiments, the rubber composition further comprises at least one conjugated-diene containing polymer or copolymer, non-limiting examples of which include styrene-butadiene copolymer, polybutadiene, natural rubber and polyisoprene.

Furthermore, encompassed within the present disclosure is a tire having at least one component containing the rubber (i.e., high-cis polydiene) produced by a process according to the processes described herein. In certain such embodiments, the component is a tire tread.

As used in the description of the invention and the appended claims, the singular forms "a," "an," and "the" are intended to include the plural forms as well, unless the context clearly indicates otherwise.

All references incorporated herein by reference are incorporated in their entirety unless otherwise stated.

The following examples are for purposes of illustration only and are not intended to limit the scope of the claims which are appended hereto.

EXAMPLES

The Mooney viscosities ($ML_{1+4}$) disclosed herein are determined at 100° C. by a Alpha Technologies Mooney viscometer with a large rotor. The sample is preheated at 100° C. for 1 minute before the rotor starts. The Mooney Viscosity measurement is recorded as the torque after the rotor has rotated 4 minutes at 100° C. The values disclosed in the Examples for $M_n$, $M_w$, $M_p$ (the peak value for the $M_n$ on the GPC curve), and polydispersity ($M_w/M_n$) are determined using GPC. The GPC measurements disclosed herein are calibrated with polystyrene standards and Mark-Houwink constants for the high-cis polydienes. The microstructure content disclosed herein, including the cis-, trans-, and vinyl-contents (%) are determined by FTIR, i.e., the samples are dissolved in $CS_2$ and subjected to FTIR.

Preparation of the Pre-Formed Catalyst

To a 200 mL dry bottle purged with nitrogen was added 5.5 mL of 20.7% (wt/wt) butadiene solution in hexane (a 1,3-butadiene blend in hexane), 11.3 mL of toluene, 5.2 mL of 4.75 M (mol/L) methylaluminoxane ("MAO") solution in toluene, 0.46 mL of 0.54 M neodymium versatate ("$NdV_3$") followed by 5.0 mL of 1.05 M diisobutylaluminum hydride ("DIBA") in hexane. The mixture was aged for 2 minutes at room temperature. Then, 0.93 mL of 1.07 M diethylaluminum chloride ("DEAC") was added. The mixture was aged for 15 minutes before being used as the Pre-formed Catalyst in each respective Example below.

Examples 1-6

Polymerization of 1,3-butadiene using t-dodecanethiol (t-dodecyl mercaptan)

To six dry bottles purged with nitrogen was added hexane and a 1,3-butadiene ("Bd") blend in hexane (the blend contained 20.7% (wt/wt) Bd in hexane), resulting in 330 g of 15.0% (wt/wt) Bd solution in hexane. Then, to each of the bottles was added 0.00 (Example 1), 0.37 (Example 2), 0.74 (Example 3), 1.11 (Example 4), 1.48 (Example 5), and 1.85 (Example 6) mL of 0.0134 M t-dodecanethiol (also known as t-dodecyl mercaptan), respectively, as shown in Table 1 below. The t-dodecanethiol was in a solution of hexane. Each respective solution was charged with 2.8 mL of the Pre-formed Catalyst described above. After the bottles containing the respective solutions were heated in a 65° C. water bath for 50 minutes, the resulting polymer cements were quenched with 3 mL of isopropanol containing 2,6-di-tert-butyl-4-methylphenol ("BHT") to terminate the reaction, coagulate, and stabilize the polymers. Following quenching, the resulting polybutadiene polymers were dried in a drum-dryer at 120° C. The polybutadiene polymer properties for each of Examples 1-6 are summarized in Table 1 below.

TABLE 1

| Example | 1 | 2 | 3 | 4 | 5 | 6 |
|---|---|---|---|---|---|---|
| t-dodecanethiol (mL) | 0.00 | 0.37 | 0.74 | 1.11 | 1.48 | 1.85 |
| t-dodecanethiol:Nd (molar ratio) | 0.0 | 0.2 | 0.4 | 0.6 | 0.8 | 1.0 |
| $NdV_3$ (mmol/100 g Bd) | 0.050 | 0.050 | 0.050 | 0.050 | 0.050 | 0.050 |
| Nd:MAO:DIBA:DEAC (molar ratio) | 1:100:21:4 | 1:100:21:4 | 1:100:21:4 | 1:100:21:4 | 1:100:21:4 | 1:100:21:4 |
| Reaction Temperature (° C.) | 65 | 65 | 65 | 65 | 65 | 65 |
| Reaction Time (min) | 50 | 50 | 50 | 50 | 50 | 50 |
| Conversion (%) | 99.8 | 99.2 | 87.7 | 71.7 | 64.2 | 54.9 |
| $ML_{1+4}$ @ 100° C. | 26.10 | 21.00 | 16.70 | 14.50 | 15.90 | 15.10 |
| $T_{80}$ (s) | 1.73 | 1.60 | 1.46 | 1.60 | 1.71 | 1.85 |
| GPC Results | | | | | | |
| $M_n$ | 110,655 | 103,677 | 93,629 | 85,017 | 83,673 | 80,575 |
| $M_w$ | 194,561 | 186,441 | 178,864 | 169,667 | 181,837 | 177,220 |
| $M_p$ | 159,024 | 148,785 | 140,564 | 132,517 | 132,818 | 127,337 |
| $M_w/M_n$ | 1.76 | 1.80 | 1.91 | 2.00 | 2.17 | 2.20 |
| Microstructure by FTIR | | | | | | |
| cis-1,4 (%) | 94.49 | 96.08 | 97.37 | 97.79 | 97.96 | 98.07 |
| trans-1,4 (%) | 4.84 | 3.30 | 2.03 | 1.56 | 1.40 | 1.27 |
| vinyl (%) | 0.67 | 0.62 | 0.61 | 0.65 | 0.64 | 0.66 |

As shown in Table 1, each of the polybutadienes of Examples 2-6 that were prepared using the thiol compound t-dodecanethiol have a higher cis-1,4-linkage content than the polybutadiene of Example 1, produced under the same polymerization conditions (i.e., the same reaction ingredients and reaction conditions) but without the thiol compound.

Examples 7-10

Polymerization of 1,3-butadiene using 1-dodecanethiol

To four dry bottles purged with nitrogen was added hexane and a 1,3-butadiene ("Bd") blend in hexane (the blend contained 20.7% (wt/wt) Bd in hexane), resulting in 330 g of 15.0% (wt/wt) Bd solution in hexane. Then to each of the bottles was added 0.00 (Example 7), 0.18 (Example 8), 0.37 (Example 9), and 1.47 (Example 10) mL of 0.134 M 1-dodecanethiol, respectively, as shown in Table 2 below. The 1-dodecanethiol was in a solution of hexane. Each respective solution was charged with 2.8 mL of the Pre-formed Catalyst described above. After the bottles containing the respective solutions were heated in a 65° C. water bath for 50 minutes, the resulting polymer cements were quenched with 3 mL of isopropanol containing BHT to terminate the reaction, coagulate, and stabilize the polymers. Following quenching, the resulting polybutadiene polymers were dried in a drum-dryer at 120° C. The polybutadiene polymer properties for each of Examples 7-10 are summarized in Table 2 below.

TABLE 2

| | Example | | | |
|---|---|---|---|---|
| | 7 | 8 | 9 | 10 |
| 1-dodecanethiol (mL) | 0.00 | 0.18 | 0.37 | 1.47 |
| 1-dodecanethiol:Nd (molar ratio) | 0.0 | 1.0 | 2.0 | 8.0 |
| $NdV_3$ (mmol/100 g Bd) | 0.050 | 0.050 | 0.050 | 0.050 |
| Nd:MAO:DIBA:DEAC (molar ratio) | 1:100:21:4 | 1:100:21:4 | 1:100:21:4 | 1:100:21:4 |
| Reaction Temperature (° C.) | 65 | 65 | 65 | 65 |
| Reaction Time (min) | 50 | 50 | 50 | 50 |
| Conversion (%) | 99.8 | 100.0 | 99.4 | 100.0 |
| $ML_{1+4}$ @ 100° C. | 28.90 | 27.80 | 28.20 | 33.10 |
| $T_{80}$ (S) | 1.56 | 1.61 | 1.62 | 1.77 |
| GPC Results | | | | |
| $M_n$ | 113,961 | 112,423 | 113,923 | 120,867 |
| $M_w$ | 208,585 | 203,647 | 211,464 | 227,414 |
| $M_p$ | 165,700 | 160,863 | 161,460 | 165,756 |
| $M_w/M_n$ | 1.83 | 1.81 | 1.86 | 1.88 |
| Microstructure by FTIR | | | | |
| cis-1,4 (%) | 94.57 | 94.64 | 94.72 | 95.58 |
| trans-1,4 (%) | 4.78 | 4.69 | 4.59 | 3.77 |
| vinyl (%) | 0.65 | 0.67 | 0.69 | 0.65 |

As shown in Table 2, each of the polybutadienes of Examples 8-10 that were prepared using the thiol compound 1-dodecanethiol have a higher cis-1,4-linkage content than the polybutadiene of Example 7, produced under the same polymerization conditions but without the thiol compound.

Examples 11-16

Polymerization of 1,3-butadiene using 4-methylbenzenethiol

To six dry bottles purged with nitrogen was added hexane and a 1,3-butadiene ("Bd") blend in hexane (the blend contained 20.7% (wt/wt) Bd in hexane), resulting in 330 g of 15.0% (wt/wt) Bd solution in hexane. Then to each of the bottles was added 0.00 (Example 11), 0.37 (Example 12), 0.74 (Example 13), 1.11 (Example 14), 1.48 (Example 15), and 1.85 (Example 16) mL of 0.0134 M 4-methylbenzenethiol, respectively, as shown in Table 3 below. The 4-methylbenzenethiol was in a solution of hexane. Each respective solution was charged with 2.8 mL of the Pre-formed Catalyst described above. After the bottles containing the respective solutions were heated in a 65° C. water bath for 50 minutes, the resulting polymer cements were quenched with 3 mL of isopropanol containing BHT to terminate the reaction, coagulate, and stabilize the polymers. Following quenching, the resulting polybutadiene polymers were dried in a drum-dryer at 120° C. The polybutadiene polymer properties for each of Examples 11-16 are summarized in Table 3 below.

TABLE 3

| Example | 11 | 12 | 13 | 14 | 15 | 16 |
|---|---|---|---|---|---|---|
| 4-methylbenzene-thiol (mL) | 0.00 | 0.37 | 0.74 | 1.11 | 1.48 | 1.85 |
| 4-methylbenzene-thiol:Nd (molar ratio) | 0.0 | 0.2 | 0.4 | 0.6 | 0.8 | 1.0 |
| $NdV_3$ (mmol/100 g Bd) | 0.050 | 0.050 | 0.050 | 0.050 | 0.050 | 0.050 |
| Nd:MAO:DIBA:DEAC (molar ratio) | 1:100:21:4 | 1:100:21:4 | 1:100:21:4 | 1:100:21:4 | 1:100:21:4 | 1:100:21:4 |
| Reaction Temperature (° C.) | 65 | 65 | 65 | 65 | 65 | 65 |
| Reaction Time (min) | 50 | 50 | 50 | 50 | 50 | 50 |
| Conversion (%) | 98.4 | 96.6 | 98.6 | 97.2 | 98.2 | 98.4 |
| $ML_{1+4}$ @ 100° C. | 27.30 | 26.60 | 25.00 | 24.10 | 23.70 | 22.50 |
| $T_{80}$ (s) | 1.61 | 1.62 | 1.60 | 1.57 | 1.59 | 1.54 |
| GPC Results | | | | | | |
| $M_n$ | 112,373 | 111,968 | 110,053 | 109,157 | 108,655 | 107,976 |
| $M_w$ | 207,531 | 202,203 | 197,345 | 194,501 | 193,563 | 189,719 |
| $M_p$ | 153,674 | 152,724 | 150,001 | 147,314 | 146,495 | 144,884 |
| $M_w/M_n$ | 1.85 | 1.81 | 1.79 | 1.78 | 1.78 | 1.76 |
| Microstructure by FTIR | | | | | | |
| cis-1,4 (%) | 94.67 | 94.77 | 94.80 | 94.93 | 95.13 | 95.28 |
| trans-1,4 (%) | 4.69 | 4.57 | 4.49 | 4.33 | 4.13 | 3.98 |
| vinyl (%) | 0.63 | 0.66 | 0.71 | 0.74 | 0.74 | 0.73 |

As shown in Table 3, each of the polybutadienes of Examples 12-16 that were prepared using the thiol compound 4-methylbenzenethiol have a higher cis-1,4-linkage content than the polybutadiene of Example 11, produced under the same polymerization conditions but without the thiol compound.

Unless otherwise defined, all technical and scientific terms used herein have the same meaning as commonly understood by one of ordinary skill in the art to which the technology of this application belongs. While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative embodiments, and illustrative examples shown and described. Accordingly, departures may be made from such details without departing from the spirit or scope of the applicant's general inventive concept.

What is claimed is:

1. A solution polymerization process for producing a high-cis polydiene, comprising:
   polymerizing at least one conjugated diene monomer in an organic solvent in the presence of at least one thiol compound and a lanthanide-based catalyst composition to produce a polydiene having a cis-1,4-linkage of 90-99%,
   wherein the at least one thiol compound is represented by the general formula R—S—H, where R is a hydrocarbyl group or a substituted hydrocarbyl group;
   wherein the lanthanide-based catalyst composition comprises (a) a lanthanide compound, (b) an alkylating agent including an aluminoxane, and (c) a halogen source, where (c) may optionally be provided by (a), (b), or both (a) and (b); and
   wherein the molar ratio of the at least one thiol compound to the lanthanide compound ranges from 0.01:1 to 100:1.

2. The process according to claim 1, wherein the molar ratio of the at least one thiol compound to the lanthanide compound ranges from 0.2:1 to 12:1.

3. The process according to claim 1, wherein the at least one thiol compound is selected from the group consisting of ethanethiol, propanethiols, butanethiols, pentanethiols, hexanethiols, heptanethiols, octanethiols, nonanethiols, decanethiols, dodecanethiols, tridecanethiols, tetradecanethiols, pentadecanethiols, hexadecanethiols, heptadecanethiols, octadecanethiols, nonadecanthiols, eicosanethiols, triacontanethiols, benzenethiol, alkyl-substituted benzenethiols, and combinations thereof.

4. The process according to claim 1, wherein the at least one thiol compound is a tertiary thiol.

5. The process of claim 1, further comprising adding the at least one thiol compound to a mixture of the at least one conjugated diene monomer and the organic solvent prior to adding the lanthanide-based catalyst composition to the mixture.

6. The process of claim 1, wherein the lanthanide-based catalyst composition is added at the same time or shortly after the thiol compound is added to the organic solvent.

7. The process of claim 1, wherein the lanthanide compound is selected from the group consisting of lanthanide carboxylates, lanthanide organophosphates, lanthanide organophosphonates, lanthanide organophosphinates, lanthanide carbamates, lanthanide dithiocarbamates, lanthanide xanthates, lanthanide β-diketonates, lanthanide alkoxides or aryloxides, lanthanide halides, lanthanide pseudo-halides, lanthanide oxyhalides, organolanthanide compounds, and combinations thereof, and the lanthanide portion of the lanthanide compound is selected from the group consisting of lanthanum, cerium, praseodymium, neodymium, promethium, samarium, europium, gadolinium, terbium, dysprosium, holmium, erbium, thulium, ytterbium, lutetium, didymium, and combinations thereof; and wherein the halogen source includes an elemental halogen, a mixed halogen, a hydrogen halide, an organic halide, an inorganic halide, a metallic halide, an organometallic halide, or combinations thereof.

8. The process of claim 7, wherein the alkylating agent further comprises, a compound represented by the general formula $AlR_nX_{3-n}$, where:

R is a monovalent organic group attached to the aluminum atom via a carbon atom, X is a hydrogen atom, a halogen atom, a carboxylate group, an alkoxide group, or an aryloxide group, and n is from 1 to 3.

9. The process of claim 1, wherein the alkylating agent includes an organoaluminum compound other than the aluminoxane.

10. The process of claim 1, wherein the at least one conjugated diene monomer is a monomer selected from the group consisting of 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, 2,4-hexadiene, and combinations thereof.

11. The process of claim 1, wherein the polymerization takes place at 50° C. to 120° C.

12. The process of claim 1, wherein the polydiene has a polydispersity value of 1.5 to 3.5.

13. The process of claim 1, wherein the polydiene has between 94% and 99% cis-1,4-linkage content.

14. The process of claim 1, wherein the polydiene is polybutadiene.

15. The process of claim 1, wherein the polymerization takes place in the presence of 20-90 weight % organic solvent based on the total weight of the monomer, organic solvent, and polydiene.

16. An improved solution polymerization process for producing a high-cis polydiene by polymerizing at least one conjugated diene monomer in an organic solvent charged with a lanthanide-based catalyst composition, wherein the improvement comprises:

polymerizing the at least one conjugated diene monomer in the presence of at least one thiol compound in the organic solvent charged with the lanthanide-based catalyst composition to produce a polydiene having a cis-1,4-linkage content of 90-99%, wherein the at least one thiol compound is represented by the general formula R—S—H, where R is a hydrocarbyl group or a substituted hydrocarbyl group;

wherein the lanthanide-based catalyst includes an aluminoxane as an alkylating agent;

wherein the polydiene produced has a higher cis-1,4-linkage content compared to a polydiene produced under the same polymerization conditions but without the at least one thiol compound; and wherein the molar ratio of the at least one thiol compound to the lanthanide compound ranges from 0.01:1 to 100:1.

17. The process of claim 16, wherein the improvement further comprises adding the at least one thiol compound to a mixture of the at least one conjugated diene monomer and the organic solvent prior to charging the mixture with the lanthanide-based catalyst composition.

18. The process of claim 16, wherein the at least one thiol compound is a tertiary thiol.

19. The process of claim 16, wherein the polydiene is polybutadiene.

20. The process according to claim 16, wherein the molar ratio of the at least one thiol compound to the lanthanide compound ranges from 0.2:1 to 12:1.

21. The process of claim 1, wherein the lanthanide-based catalyst composition is added at the same time or shortly after the thiol compound is added to the organic solvent.

* * * * *